United States Patent [19]

Vartiak

[11] 3,956,538

[45] May 11, 1976

[54] FLAME RETARDATION
[75] Inventor: Joseph F. Vartiak, Naperville, Ill.
[73] Assignee: Nalco Chemical Company, Oak Brook, Ill.
[22] Filed: Oct. 29, 1974
[21] Appl. No.: 518,494

[52] U.S. Cl. .................................. 427/343; 427/4; 427/426; 427/427; 428/921
[51] Int. Cl.² ........................ B05D 3/10; C09K 3/28
[58] Field of Search ................... 117/3, 138, 62, 69, 117/140 B, 105.5; 427/343, 4, 426, 427; 428/921

[56] References Cited
UNITED STATES PATENTS

| | | | |
|---|---|---|---|
| 1,224,204 | 5/1917 | Perkin | 117/138 |
| 1,397,858 | 11/1921 | Craig | 117/138 |
| 1,593,752 | 7/1926 | Craig | 427/343 |
| 1,738,976 | 12/1929 | Vivas | 117/138 |
| 3,537,873 | 11/1970 | Degginger | 117/3 |

FOREIGN PATENTS OR APPLICATIONS

| | | | |
|---|---|---|---|
| 244,503 | 12/1925 | United Kingdom | 427/343 |

OTHER PUBLICATIONS

*Condensed Chemical Dictionary,* 8th Ed., p. 793 (1971).

*Primary Examiner*—Harry J. Gwinnell
*Attorney, Agent, or Firm*—Kinzer, Plyer, Dorn & McEachran

[57] ABSTRACT

Resistance to flame propagation or accidental ignition in the first place is achieved by applying to the surface in sequence, but not together, calcium chloride and sodium aluminate each in aqueous solution.

5 Claims, No Drawings

FLAME RETARDATION

This invention relates to flame retardants, specifically a combination of calcium chloride and sodium aluminate, each in aqueous solution applied sequentially.

Railroads are particularly aware of the fact that the right-of-way and some sidings can literally constitute a tinder box, susceptible to ignition from an accidental spark. They are customers for large amounts of flame retardants, notably sodium silicate or sodium metaborate presently being supplied.

Suppression of flame propagation can be achieved with sodium silicate in approximately equal parts with water, but only at a considerable cost per acre. A less expensive but far less efficient flame suppressant is sodium metaborate; an effective preparation is 870 pounds dissolved in 585 pounds of water, costing somewhat less than the sodium silicate treatment. However, the borate is presently in short supply and its cost can be expected to increase.

As a consequence of cost and short supply the railroads are earnestly seeking an effective flame retardant, one readily available at a reasonable price, and the object of the present invention is to satisfy this need by making available a flame retardant every bit as effective as sodium silicate and more effective than sodium metaborate, at far less cost than each.

Specifically the object of the present invention is to employ calcium chloride and sodium aluminate, in aqueous solution, as a flame retardant, at far less cost than both the sodium silicate and sodium metaborate treatment, while being every bit as effective as sodium silicate and more so than sodium metaborate.

In accordance with the objective of the present invention a considerable amount of screening was first undertaken to determine among suspected candidates if any single material or combination showed promise of supplanting both sodium silicate and sodium metaborate.

Among the first of the problems encountered was to develop a screening test. I eventually decided to immerse eight inch long paper strips in a large vial containing an aqueous solution of the material being tested, leaving the top two inches unimmersed to serve as the untreated area for ignition. When the strips were dry, they were positioned upright, ignited at the untreated end (the bottom) and allowed to burn freely until self-extinguished. The extent to which the strip was burned served as a measure of the flame retardant ability of the treating material. The materials for screening included sodium aluminate, singly and combined with various acids; sodium silicate combined with sodium aluminate; calcium chloride; and calcium chloride in combination with sodium aluminate.

Calcium chloride showed excellent flame retardant ability but no resistance to leaching, meaning it would not be retained on a substrate after a rain shower. Sodium aluminate also showed promise.

Calcium chloride and sodium aluminate when combined produced a precipitate, seemingly incapable of being sprayed which is the only economical way to apply a flame retardant to a railroad right-of-way.

In view of the clear effectiveness of the calcium chloride by itself, consideration was given to some way of imparting leach-resistance. One method tried was to first spray the calcium chloride solution on the test strip followed by an overspray of sodium aluminate. This technique produced good results; so did the reverse procedure of first applying sodium aluminate and overspraying with calcium chloride. A successful treatment had been screened.

A more complete test was therefore developed to simulate field conditions. A given area of a cardboard test panel was covered with one pound of shredded paper, highly flammable. Many such test panels were prepared, each covered with the same amount of paper of the same kind in the same scatter pattern. The shredded paper was then sprayed with various flame retardants in aqueous solution under conditions carefully controlled to assure uniform coverage and that only the flame retarding material would be responsible for observed differences in flame retarding ability: the same spray nozzle orifice at 40 psi, the same rate of spray movement, the same spray pattern while maintaining the spray nozzle at the same measured distance from the cardboard surface and the same extent of spray time. The sprayed paper on each panel was allowed to dry and then was ignited; a record was made of the time to completely burn the shredded paper. The following is a tabulation of the results:

SPRAYING TEST - 10 Sq. Ft. ON SHREDDED PAPER

| | Treatment * | Time ** |
|---|---|---|
| 1. | Sodium Aluminate 21% 300 gallons | 3 Min. |
| 2. | Sodium Aluminate 10.6% 300 gallons | 2 Min |
| 3. | Liquidow 16% 300 gallons | 3 Min. |
| 4. | Sodium Aluminate 4.2% + Phosphoric acid 4.8% 300 gallons | 1½ Min. |
| 5. | Sodium Aluminate 10.8% + Phosphoric acid 1.6% 300 gallons | 2 Min |
| 6. | Sodium Aluminate 21.7% 300 gallons oversprayed Phosphoric acid 8.5% 300 gallons | 2 Min. |
| 7. | Sodium meta borate ($5H_2O$) 870 lbs. + 585 gallons water | 1 Min. 5 Sec. |
| 8. | Sodium Silicate 18.7% 605 gallons + water 605 gallons | 3 Min. |
| 9. | Sodium Aluminate 31.8% 300 gallons + Sodium Acrylate (32 oz.) | 2½ Min. |
| 10. | Sodium Aluminate 6.1% 100 gallons oversprayed by Liquidow 16.2% 500 gallons | 2½ Min. |
| 11. | Liquidow 16.2% 500 gallons oversprayed by Sodium Aluminate 6.1% 100 gallons | >5 Min. |
| 12. | Liquidow 16.2% 500 gallons oversprayed by Sodium Aluminate 10.6% 100 gallons | >5 Min. |
| 13. | Sodium Aluminate 10.6% 100 gallons oversprayed by Liquidow 16.2% 500 gallons | 2½ Min. |
| 14. | Sodium Aluminate 21.2% 300 gallons + Sodium Acrylate (48 oz.) | 3½ Min. |
| 15. | Liquidow 24% 500 gallons + Sodium Acrylate (120 oz.) | >5 Min |
| 16. | Sodium Silicate 18.7% 300 gallons oversprayed by Liquidow 16% 300 gallons | 3 Min. |
| 17. | Sodium meta borate ($5H_2O$) 870 lbs. + 585 gallons water | 4 Min. 20 Sec. |
| 18. | Sodium meta borate ($10H_2O$) 870 lbs. + 585 gallons water | 4 Min. 20 Sec. |
| 19. | Sodium Aluminate 10.6% 400 gallons + Sodium Acrylate (128 oz.) | 2½ Min. |
| 20. | Sodium Aluminate 16.8% 300 gallons + Sodium Acrylate (96 oz.) | 5 Min. |
| 21. | Liquidow 16% 500 gallons oversprayed by Sodium Aluminate 6.3% 100 gallons | >5 Min. |
| 22. | Liquidow 16% 500 gallons oversprayed by Sodium Aluminate 10.6% 200 gallons | >8.5 Min. |
| 23. | Sodium Aluminate 14% 200 gallons oversprayed by Liquidow 16% 500 gallons | 5 Min. Flame out |
| 24. | Sodium Aluminate 10.6% 200 gallons oversprayed by Liquidow 16% 500 gallons | 5 Min. Flame out |

-continued
SPRAYING TEST - 10 Sq. Ft. ON SHREDDED PAPER

| Treatment * | Time ** |
|---|---|
| 25. Blank (water) 600 gallons | 1½ Min. |

* All percents are percent active; parts by weight
** Minutes to burn the treated shredded paper The Liquidow (trademark) flame retardant material is calcium chloride supplied by Dow Chemical; a small amount of magnesium chloride may be present as an impurity.

The best of the treatments set forth above provide good fire protection at lower cost and are less susceptible to losing fire protection due to rain when compared to the present commercially available products. The preferred treatments are listed in decreasing order of over-all characteristics:

1. Spraying first calcium chloride 500 gallons (16% active) followed by over spraying with sodium aluminate 200 gallons 10% active.
2. Spraying first sodium aluminate 200 gallons (10% active) followed by over spraying calcium chloride 500 gallons 16% active.
3. Spraying first calcium chloride 500 gallons (16% active) followed by over spraying with sodium aluminate 100 gallons 6% active.

In the field the invention is practiced in one form by propelling a vehicle along a railroad track. The fire retardant materials are contained in separate large tanks and are sprayed under pressure on the right-of-way. One sprayer is aimed well ahead of the second sprayer so that the second spray, in effect, drops as an over-spray on the one first applied. In this connection it will be appreciated the spray test on shredded paper explained above represents the haphazard application that may occur when spraying vegetation and debris along the right-of-way.

The spray solution may be advantageously modified by including Humectants, surface-active (spreading and wetting) agents, and film-formers. The best treatment under the present invention (item No. 22) represents a considerable savings in cost, about one-fourth the cost of the metaborate treatment and about one-sixth the cost of treatment with sodium silicate.

I claim:

1. A method of rendering flame resistant a surface susceptible to ignition comprising: applying to the surface, sequentially but not together, an aqueous solution of calcium chloride and an aqueous solution of sodium aluminate.

2. A method according to claim 1 in which the calcium chloride is sixteen percent by weight and the sodium aluminate ten percent by weight, and in which the proportions and order are 500 gallons of calcium chloride sprayed first and 200 gallons of sodium aluminate sprayed second.

3. A method according to claim 1 in which the sodium aluminate is ten percent by weight and the calcium chloride sixteen percent by weight, and in which the proportion and order are 200 gallons of sodium aluminate sprayed first and 500 gallons of calcium chloride sprayed second.

4. A method according to claim 1 in which the calcium chloride is sixteen percent by weight and the sodium aluminate is six percent by weight, and in which the proportion and order are 500 gallons of calcium chloride sprayed first and 100 gallons of sodium aluminate sprayed second.

5. A method according to claim 1 in which the aqueous solutions are contained in tanks on a vehicle, the solutions being sprayed from the vehicle with one solution being applied by a sprayer aimed ahead of the second sprayer so that the second spray drops on the first.

* * * * *